UNITED STATES PATENT OFFICE 2,311,301

WATER DISPERSED ADHESIVE COMPOSITION AND ARTICLES COMPRISING THE SAME

Harvey J. Livermore, Detroit, Mich., assignor to Minnesota Mining & Manufacturing Company, St. Paul, Minn., a corporation of Delaware No Drawing. Application August 3, 1940, Serial No. 351,114

4 Claims. (Cl. 260—745)

The present invention relates to adhesives and methods of producing the same. It is also directed to articles made with adhesives of the type hereinafter described.

My invention is particularly concerned with water-dispersed rubber-containing adhesives. An important use of adhesives of the present invention is exemplified in the construction of auto bodies, particularly in attaching what is known as roof pads or silencer pads to the interior metal surface of the bodies.

Heretofore solvent type adhesives have been used to some extent for this purpose. Endeavors have also been made to employ water-dispersed adhesives or cements for this purpose, but all such materials of the water-dispersion type, so far as I am aware, have been defective and unsatisfactory in one particular or another. For example, such materials generally, in the form of the dried residue or dried film, have not had satisfactory properties of heat resistance, where the adhesion of the cements were satisfactory.

Most water-dispersed adhesives have had unsatisfactory adhesive qualities and in particular were slow to develop sufficient adhesion. Further, those water-dispersed adhesives having satisfactory adhesive qualities were low in heat resistance in the form of the dried film.

It is the object of this invention to provide a water-dispersed adhesive which will be both satisfactory in adhesive qualities and have advantageous properties, including heat resistance, in the form of the dried film or the dried residue.

It is also an object of my invention to provide an adhesive composition which in the form of the dried film has a low susceptibility factor, that is, does not become brittle at low temperatures and does not soften unduly at high temperatures. Another object of the present invention is to do away with the fire hazard and toxicity which accompanies the use of solvent type of cements such as the ordinary gasoline type of solvent cements. These and other objectives and advantages will appear from the description as a whole.

The following composition will illustrate a preferred type of adhesive composition of the present invention:

| Reclaimed rubber | pounds | 666 |
|---|---|---|
| Asphalt | do | 1000 |
| Wood rosin | do | 117 |
| Potassium hydroxide solution | do | 44 |
| Water | gallons | 72 |

To illustrate and not to limit the above composition, the ingredients may be, for example, further defined as follows:

The reclaimed rubber may be prepared from old automobile inner tubes, as for example by the alkali digester reclaiming process or from any other suitable source of scrap rubber.

It is important that the asphalt be a high-melting point composition. It may for example be a petroleum residual asphalt which has been steam and air refined (i. e. steam refined and then blown with air) and having a melting point, ball and ring method, of approximately 300° F., and a low penetration, e. g. 0 to 5 at 77° F. It is preferred that the melting point of the asphalt be above 275° F. and it is ordinarily preferred that the same be at least 300° F. The asphalt should preferably be prepared from an asphaltic base crude oil, as distinguished from a mixed base or paraffin base crude. Various asphaltic base Texas and Venezuelan crude petroleum oils have yielded very satisfactory asphalt material for my purposes.

An illustration of wood rosin which I have employed to advantage is a heat treated dark colored wood rosin having an acid number of approximately 125; however other treated or untreated wood rosins or other rosins or comparable resins may be used.

The potassium hydroxide solution employed in the above example was an aqueous KOH solution in which the KOH made up 50% by weight of the solution.

While the broader aspects of my invention are not to be limited by the particular method of making the same, yet nevertheless I much prefer to first produce a uniform plastic composition in which water is dispersed in a mixture of reclaimed rubber and resinous material and then such dispersion is inverted so that the water in the finished product makes up the continuous phase and the rubber composition makes up the dispersed phase.

The resulting composition of the present invention, when produced according to such method, particularly the method hereinafter further characterized, has special properties which are apparently not attainable by the direct mixing of the ingredients without dispersion. That is, the properties of the cement or adhesive are determined not only by the ingredients that make up the same, but also by the particular physico-chemical or interfacial relation of such ingredients to each other in the mixture.

A preferred procedure for compounding the ingredients of the above formula is generally similar to that set out, especially, on page 15 et seq., in the co-pending Livermore et al. application S. N. 247,842, that is, the rubber, asphalt and wood rosin are mixed together with a limited amount of water to get a uniform plastic, viscous mass and then, while the composition contains the proper amount of water for inversion, the alkali or potassium hydroxide is added so that inversion is effected simultaneously with the formation of the resin soap.

This appears to produce some special phase relation which contributes to the desirable properties of my dispersed adhesive. This may be due to the fact that the organic or resin acid is extracted from the rubber and/or asphalt particles while the inversion is taking place, the resin acid reacting with the potassium hydroxide to form a resin soap. This apparently lends some special character to the resulting rubber and/or asphalt particles which then become dispersed in the aqueous vehicle and the resulting physico-chemical phase relation produced favorably influences the property of the resulting dispersion or adhesive.

It is important that the water-in-oil type of dispersion be converted to form the oil-in-water type of dispersion with the amount of water present being sufficient, but not greatly in excess of that amount which is sufficient, to permit inversion of the emulsion upon the addition of the alkali and to form the continuous phase of the resulting oil-in-water dispersion. It is also important to have the temperature sufficiently low when the inversion is effected and I have found that the preferred temperature range, in the case of the composition above illustrated, is in the range of 135° to 175° F. and is preferably in the range of about 150° to 160° F. Ordinarily 140° F. is about as low a temperature as can be employed feasibly because the batch becomes so stiff that the power requirements become excessive and, furthermore, the proper working of the mixture becomes difficult.

By referring to the specification of the aforementioned co-pending Livermore et al. application, it will be seen that it is desired to effect the mixing or fluxing of the asphalt and reclaimed rubber and rosin preliminary to the inversion step, at a substantially higher temperature than that employed for effecting the inversion. For example, a temperature of the order of about 250° F. may be employed for such mixing or fluxing. To bring down the temperature to the desired inversion temperature, I prefer to add the water largely or entirely in the form of ice.

The physical properties of my adhesive or dispersion differs decidedly from that of any of the compositions disclosed in the aforementioned co-pending application. The high-melting point of the asphalt employed is believed to be an important contributing factor.

The specific composition above illustrated may have its ingredients varied in kind and quantity within limits. For example, the reclaimed rubber may be somewhat reduced in amount with respect to the asphalt or may be somewhat increased in amount and this generally results in a corresponding variation in the resiliency of the final dried residue or film of the cement, although the resiliency will not be appreciably effected where the proportions given are generally approximated.

The wood rosin employed furnishes the resin acid and hence it should always be employed in sufficient quantity to provide the necessary soap, upon reaction with alkali hydroxide to effect the desired inversion of phase.

A cement of the above type, especially when compounded according to my preferred procedure, has a number of valuable properties:

(1) The dried film of such adhesive is sufficiently heat resistant to hold roof pads, felt and similar materials in place, for example on the inside metal surfaces of auto bodies, at temperatures in the range of 250° to 300° F. For example, such adhesive films or coatings commonly encounter temperatures of 275° F. when auto bodies are passed through the enameling or paint ovens, and hold such roof pads or the like in place under such temperature conditions. It will be evident that this property is of high importance in the assembling of automobiles.

(2) The felt, roof pads or similar materials can be made to adhere firmly to the metal surfaces immediately after application of the adhesive by the use of moderate pressure when applying the felt or other comparable material to the metal. Suitable pressures would ordinarily not exceed about 50 lbs. per square inch, but relatively low pressures are sufficient to form a good bond. However, a minimum pressure of about 10 lbs. per square inch is normally desirable in forming a bond with most felts or roof pads or like porous or cellulosic materials.

A very thin coating of my adhesive composition is sufficient to attach these felt or similar materials firmly to a metal surface. For example, one gallon of my adhesive is sufficient to cover about 250 to 350 square feet of metal surface.

The dried adhesive films of my adhesive composition have very low susceptibility factors. That is, they do not become brittle at low temperatures, e. g., minus 30° F., nor do they soften excessively at high temperatures up to 250° to 300° F.

It will be readily apparent that in addition to the advantages of such properties in the assembly lines of automobile plants, it is also highly desirable to have auto bodies in which the silencer pads will not loosen and fall away from the metal surfaces when the automobile is accidentally subjected to a temperature equivalent to that of relatively low pressure steam.

While I have defined my adhesive compositions and preferred articles made therewith, primarily in connection with the construction of automobiles and auto bodies, it will be understood that my invention also comprehends other structures or composite articles made with such adhesive compositions. My adhesive compositions may be employed for other uses than the one illustrated, where properties such as herein described are desired.

All variations and embodiments within the scope of the appended claims are contemplated.

What I claim is:

1. The method of making an adhesive composition which comprises working together reclaim rubber, a high melting point asphalt and wood rosin at a temperature above 200° F. in an internal mixer to form a smooth mass, then simultaneously cooling said mixture and introducing a limited amount of water thereto by introducing the same largely in the form of ice while continuing the mixing, and then when the amount of water introduced into the mass is sufficient, but not greatly in excess of that amount which is sufficient, to permit inversion of the emulsion upon the addition of alkali hydroxide and, while maintaining the temperature of the mass in the range of 140° to 165° F., adding an alkali hydroxide thereto in a sufficient amount to effect inversion of the dispersion, whereupon water becomes the continuous phase and the mixture comprising rubber and asphalt is dispersed therein.

2. An adhesive dispersion of the oil-in-water type and of viscous consistency prepared in accordance with the process of claim 1, said dispersion having a plurality of ingredients, the predominating solids ingredients comprising rubber and a high melting point asphalt, said dispersion being of fine particle size and resistant to change in viscosity upon ageing, and being of such character that an adhesive bond can be made between a felt and a metal surface immediately following the application of a coating of such adhesive to the metal surface, and further characterized in that upon evaporation or partial evaporation of water it yields a highly tacky, pressure-sensitive adhesive film which, in the dried state, is sufficiently heat-resistant to maintain its bonding effect and to hold in place felt to a metal surface at a temperature of approximately 275° F.

3. The method of making an adhesive composition which comprises working together rubber, asphalt having a melting point of at least approximately 300° F. and wood rosin at a temperature of the order of 250° F. in an internal mixer to form a smooth mass, then simultaneously cooling said mixture and introducing a limited amount of water thereinto by introducing the same partly in the form of ice while continuing the mixing, and then when the amount of water introduced into the mass is sufficient, but not greatly in excess of that amount which is sufficient to permit inversion of the dispersion upon the addition of alkali hydroxide and, while maintaining the temperature of the mass in the range of 140° F. to 165° F., adding an alkali hydroxide thereto in a sufficient amount to effect inversion of the dispersion, whereby water becomes the continuous phase and the mixture comprising rubber and asphalt is dispersed therein.

4. An adhesive dispersion of the oil-in-water type and of viscous consistency prepared in accordance with the process of claim 3, said dispersion having a plurality of ingredients, the predominating solids ingredients comprising rubber and asphalt, the latter having a melting point of at least about 300° F., said dispersion being of fine particle size and resistant to change in viscosity upon ageing and, upon application as a thin coating or film to a surface, will immediately form a bond with a porous, water absorbent sheet, and further characterized in that upon evaporation or partial evaporation of water it yields a highly tacky, pressure-sensitive, adhesive film which, in the dried state, is sufficiently heat-resistant to maintain its bonding effect and to hold in place felt at temperatures approximating 275° F.

HARVEY J. LIVERMORE.